US007577512B2

(12) United States Patent
Herz et al.

(10) Patent No.: US 7,577,512 B2
(45) Date of Patent: Aug. 18, 2009

(54) METHOD FOR SWITCHING BETWEEN OPERATING MODES OF AN INTERNAL COMBUSTION ENGINE HAVING A PLURALITY OF CONTROL UNITS

(75) Inventors: Klaus Herz, Flein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 11/901,066

(22) Filed: Sep. 14, 2007

(65) Prior Publication Data

US 2008/0133107 A1 Jun. 5, 2008

(30) Foreign Application Priority Data

Sep. 20, 2006 (DE) ...................... 10 2006 044 077

(51) Int. Cl.

*G06F 19/00* (2006.01)
*G05B 19/18* (2006.01)
*G05B 23/02* (2006.01)
*G01M 19/00* (2006.01)
*B60L 1/00* (2006.01)

(52) U.S. Cl. ...................... 701/114; 701/102; 307/10.1; 340/3.1; 340/3.42; 73/114.58; 700/3

(58) Field of Classification Search ............. 701/29-36, 701/101-103, 114, 115; 123/90.15, 198 F, 123/481; 73/114.31, 114.37, 114.56, 114.58, 73/114.61, 114.68, 114.69; 700/2, 3; 340/3.1, 340/3.42, 3.5; 307/10.1

See application file for complete search history.

(56) References Cited

U.S. PATENT DOCUMENTS

| | | | | |
|---|---|---|---|---|
| 5,132,905 | A * | 7/1992 | Takai et al. | 701/33 |
| 6,128,560 | A * | 10/2000 | Ishii | 701/29 |
| 6,435,019 | B1 * | 8/2002 | Vojtisek-Lom | 73/114.69 |
| 7,380,535 | B2 * | 6/2008 | Hartmann et al. | 123/198 F |
| 2007/0079781 | A1 * | 4/2007 | Gaessler et al. | 123/90.12 |
| 2007/0113820 | A1 * | 5/2007 | Hartmann et al. | 123/198 F |

* cited by examiner

*Primary Examiner*—Willis R Wolfe, Jr.
(74) *Attorney, Agent, or Firm*—Kenyon & Kenyon LLP

(57) ABSTRACT

A method for switching between operating modes of an internal combustion engine having a plurality of control units, in particular a switchover between full-engine operation and half-engine operation, the control units being able to exchange data via a data link. The method includes a step in which it is checked whether an operating mode switchover should occur and that, if an operating mode switchover should occur, the data link between the control units is tested and/or the operating state of the control units is balanced.

14 Claims, 2 Drawing Sheets

METHOD FOR SWITCHING BETWEEN OPERATING MODES OF AN INTERNAL COMBUSTION ENGINE HAVING A PLURALITY OF CONTROL UNITS

FIELD OF THE INVENTION

The present invention relates to a method for switching between operating modes of an internal combustion engine having a plurality of control units, in particular a switchover between full-engine operation and half-engine operation, it being possible for the control units to exchange data via a data link.

BACKGROUND INFORMATION

In the cylinder shutoff of an internal combustion engine, a portion of the cylinders is shut off; for example in half-engine operation (HMB), one-half of the cylinders are shut off by shutting off the intake and exhaust valves as well as the injection, making it possible to save fuel compared to full-engine operation (VMB). Alternatively, half-engine operation can also be implemented by shutting off the injection (abbreviated as HMBEVA). Fresh air is then pumped through the relevant cylinder, as a result of which the downstream catalytic converter can no longer convert at a lambda value equal to one. Therefore, HMBEVA is only implemented in a bank blank-out configuration, since one cylinder bank is always operated normally and completely. In half-engine operation, all cylinders in the second cylinder bank are then blanked out (shut off).

Implementations of half-engine operations have only been known so far for designs in which one control unit (SG) is used. When two control units are used, the cylinders of one bank are controlled by one control unit. The cylinders of the other bank are controlled by the second control unit. In half-engine operation including injection shutoff and continued operation of the gas exchange valves, one control unit continues to operate the injection and the other control unit completely shuts it off. Information between the two control units is normally exchanged via a bus, for example, a CAN bus or a FlexRay bus.

SUMMARY OF THE INVENTION

One object of the present invention is to make it possible to switch operating modes over, in particular a cylinder shutoff, including shutting off the injection and continued operation of the gas exchange valves, in an internal combustion engine having two control units.

This objective is achieved by a method for switching over between operating modes of an internal combustion engine having a plurality of control units, in particular a switchover between full-engine operation and half-engine operation, the control units being able to exchange data via a data link, the method including a step in which it is checked if an operating mode switchover should occur and that, if an operating mode switchover should occur, the data link between the control units is tested and/or the operating state of the control units is balanced. The operating state of the control units includes, for example, the operating mode full-engine operation or half-engine operation; an operating mode switchover is a change between the operating modes.

The check of whether a switchover should occur preferably includes the evaluation of a state or a content of a means for data transfer, for example, the evaluation of a message (of a datagram) on a data bus which connects the control units, for example, to a higher-level control unit. This message initiates the operating mode switchover. Alternatively, a status bit, e.g., for a change of a setpoint operating mode, may also be set in the control units in order to trigger a change of the operating mode. Preferably it is provided that the test of the data link includes a test of the electrical connection between the control units. In doing so, the function of the physical connection is checked. The test of the data link preferably includes a transfer of at least one data packet between the control units and a check of the transferred data packets for transmission errors. In this way, a logical test is performed; in addition to the physical (line) connection, it is thus also checked if a transfer of data is possible.

Preferably it is provided that in switching over from full-engine operation to half-engine operation, a check is made after a balancing time whether the control units are in the half-engine operation operating mode and that the half-engine operation is prohibited in different operating modes of the control units, all control units subsequently passing into full-engine operation. Thus after a specific time, i.e., the balancing time, the control units expect that the control unit or other control units have successfully switched over. If this is not the case, all control units automatically switch over to full-engine operation. The advantage of this is that in the event of error, a safe operating state, namely full-engine operation, is set.

Preferably it is provided that during the switchover operation of at least one control unit a check is performed at specific times and/or events for the presence of a specific operating state of another control unit. Preferably it is provided that if a specific operating state of the other control unit is present, switchover is continued. If the specific operating state of the other control unit is absent, switchover is preferably interrupted or stopped. This measure also ensures a safe operating state of the internal combustion engine. In the case of an interruption, additional test routines may be started or it is possible to wait for a delay in the switchover of one of the control units.

This objective referred to above is also achieved by a device, in particular a control unit including means for switching over between operating modes of an internal combustion engine having a plurality of control units, in particular a switchover between full-engine operation and half-engine operation, the control units being able to exchange data via a data link, the device including means used to check if an operating mode switchover should occur and that, if an operating mode switchover should occur, the data link between the control units is tested and/or the operating state of the control units is balanced.

The object referred to above is also achieved by a computer program having program code for implementing all steps according to a method according to the present invention when the program is executed in a computer.

DETAILED DESCRIPTION

Figure 1:
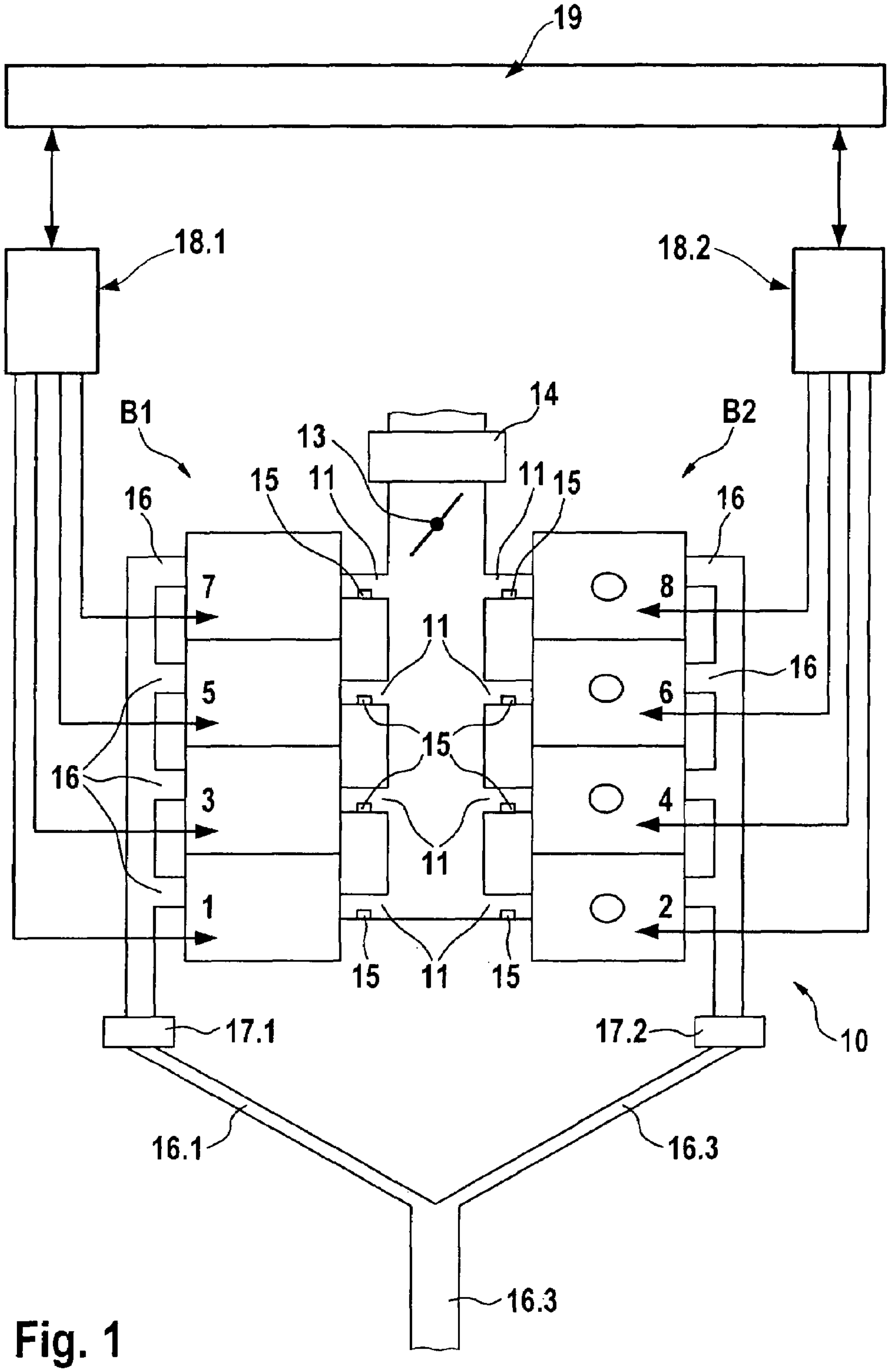
FIG. 1 shows a sketch of an internal combustion engine having two cylinder banks.

FIG. 1 shows an internal combustion engine 10 having two cylinder banks which are denoted as B1 and B2, based on an 8-cylinder engine. Similarly, configurations of, for example, 4 cylinders, 6 cylinders, 10 cylinders, 12 cylinders and the like are, of course, possible with a shared suction chamber. In this case, the cylinders are numbered consecutively 1 through 8. An intake pipe 11 is assigned to each of cylinders 1 through 8, the intake pipes opening into a common intake manifold 12. Intake manifold 12 includes a throttle valve 13 and an air mass-flow sensor 14. An injection nozzle 15 is situated in each intake pipe 11. Injection nozzle 15 is used to inject fuel into particular assigned intake pipe 11. Each of cylinders 1 through 8 includes at least one intake valve and at least one exhaust valve, which are not shown in greater detail in the sketch of FIG. 1. Opening the particular intake valve of a cylinder makes it possible to draw air or a fuel-air mixture into the particular cylinder through fuel, which was injected into the particular cylinder using the particular injection valve. Opening the assigned exhaust valve expels the combusted fuel-air mixture in the exhaust system into exhaust manifold 16. Instead of intake manifold injection (SRE) as shown here, direct gasoline injection (DGI) may of course also be provided.

Exhaust manifolds 16 are combined into an exhaust pipe 16.1 for bank 1 and 16.2 for bank 2, each of them opening into a common exhaust pipe 16.3. Lambda sensors denoted as 17.1 and 17.2 are situated in exhaust pipe 16.1 and 16.2, respectively. Lambda sensors 17.1 and 17.2 may be used to measure the lambda values for cylinder bank B1 and B2, respectively. To that end, lambda sensors 17.1 and 17.2 generate an electrical signal representing the particular lambda value. Downstream of lambda sensors 17.1 and 17.2 one or a plurality of catalytic exhaust gas converters are situated; additional flow elements, such as an exhaust turbocharger or the like, may also be situated there.

A control unit 18.1 for first bank B1 and a control unit 18.2 for second bank B2 each control the operating or combustion parameters of the individual cylinders of banks B1 and B2. Control units 18.1 and 18.2 thus perform control or regulation separately for bank B1 and bank B2, respectively. The control units control all controllable operating parameters, in particular ignition, air quantity, injected fuel quantity and—point in time and, if necessary, the valve timing in partially or completely variable valve gears. In FIG. 1, this is shown schematically by arrows between control units 18.1 and 18.2 and cylinders 1 through 8, respectively. Control units 18.1 and 18.2 may exchange data bidirectionally via a bus system, a CAN bus 19 in this case, and receive data from a higher level control unit, which is not shown here, via CAN bus 19.

The lambda value reflects the proportion of oxygen in the fuel-air mixture relative to the proportion of oxygen necessary for stoichiometric combustion. The lambda value is regulated to a setpoint individually for each cylinder or for each bank. Control variables for the regulation are, for example, the injected fuel quantity per cylinder, the air quantity and, in a variable valve control, for example, the control times of the gas exchange valves. This makes it possible to adjust the volumetric efficiency of the cylinders individually. The volumetric efficiency may also be influenced for all cylinders in aggregate by adjusting the throttle valve.

In addition to a full-engine operation (VMB) of the internal combustion engine in which all cylinders participate in the torque produced by the crankshaft of the internal combustion engine, half-engine operation (HMB or HMBEVA) exists in which only a portion of the cylinders of the internal combustion engine participate in the generation of torque. The remaining cylinders are carried along; this may by the result of, for example, reducing the injected quantity of fuel for the particular cylinders to zero. In variable valve timing, it is further possible to keep the intake valve or intake valves or the exhaust valve or exhaust valves of an entrained cylinder continuously closed or continuously open. If the intake valve or intake valves or exhaust valve or exhaust valves of a cylinder are kept continuously closed, no air is pushed through. If only the injected fuel quantity is set to zero, air is pushed through the particular cylinder, since the air is drawn in the intake stroke and is thus ejected into the exhaust system in the exhaust stroke. It is assumed below that a shut off cylinder conveys air (pushes it through) and no fuel is injected when the cylinder is shut off.

In FIG. 1, cylinders which are shut off are denoted by a black dot. Half-engine operation is shown in which cylinders 2, 4, 6 and 8 are not fired. Cylinder bank B2 is thus shut off; cylinder bank B1 is fired.

In the present exemplary embodiment, the half-engine operation is implemented only by a shutoff of the injection (HMBEVA). Half-engine operation may be implemented in such a way that one bank is completely shut off and therefore only air is pushed through; the other bank continues to be operated in normal operation.

If the engine operation is switched over from full-engine operation to half-engine operation, the two control units 18.1, 18.2 must be balanced in such a way that both control units request the same setpoint operating mode (full-engine or half-engine operation) and are also in the same state (both in full-engine or both in half-engine operation). The two control units must be balanced. The balancing may occur by checking a functioning CAN bus connection in general and a valid CAN message specifically. Another alternative is, for example, a direct connection of the two control units via a separate data line.

A switchover of the engine operation must be made secure in such a way that even in the absence of expected CAN variables, i.e., expected data packets of the other control unit on the CAN bus, the switchover is reliably terminated or aborted by suitable program sequences or substitute measures.

Figure 2:
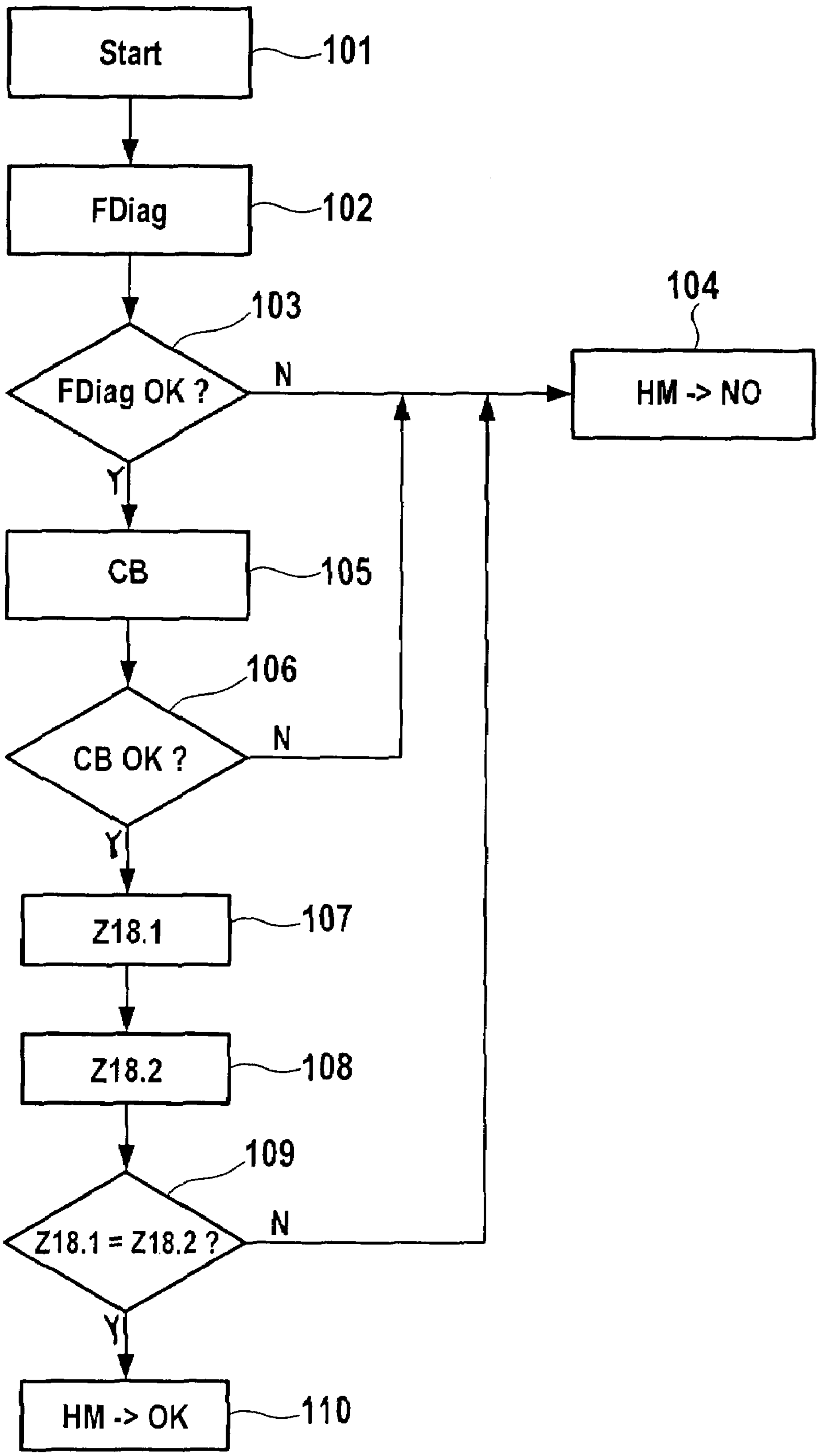
FIG. 2 shows a flow chart of the method.

An exemplary embodiment of a method according to the present invention is shown as a flow chart in FIG. 2. The method starts in step 101 with a check as to whether an operating mode switchover should occur, initiated or released by, for example, a higher level control unit. If this is the case, which is triggered, for example, by a CAN message, the process branches to step 102. In step 102, a functional diagnosis (FDiag) of the general CAN bus connection is made. It is checked if the CAN bus is functional from the perspective of both control units. The physical connection between both control units 18.1 and 18.2 is checked. In step 103, it is determined whether the connection is error-free (FDiag OK?) (Option Y) or whether a connection error is present (Option N). If a connection error is present, the program branches to step 104 and half-engine operation is prohibited (HM->NO). If the physical connection is error-free, the program branches to step 105 and a CAN message CB is exchanged between the two control units. In step 106, it is checked whether message CB was successfully exchanged (CB OK?) (Option Y) or whether it was not possible to successfully exchange message CB (Option N). If it was not possible to successfully exchange message CB, the program branches to step 104 and half-engine operation is prohibited. If it was possible to exchange a message between the two control units successfully, the program branches to step 107, in which state Z18.1 of first control unit 18.1 is determined. Following that, state Z18.1 of second control unit 18.2 is determined in step 108.

In step 109, it is checked whether the state of first control unit 18.1 is equal to the state of second control unit 18.2. If this is not the case, it is indicated by Option N; the program branches to step 104 and half-engine operation is prohibited. If the test in step 109 shows that the state of the two control units is equal, the program branches to step 110 and half-engine operation is allowed (HM->OK). Half-engine operation on the one hand or full-engine operation on the other hand is meant here as the state of the control units. However, intermediate states may also be set when switching between the two engine operating modes. The state of the control units may, for example, be characterized by a status counter and/or via status bits, which may then be balanced between the two control units via the CAN bus.

A safeguard is implemented at all points in the sequence of operations of the switchover control in which one control unit must wait for information from the other control unit for the operation to continue. For example, a timer may be started at the corresponding points. If, after a predetermined time period ends, the corresponding variable at the CAN bus is not present, a suitable error response must take place.

A suitable error response in the event of an unsuccessful joint switchover between the operation modes by the control units must be selected as a function of the present operating mode of the control units in such a way that the switchover is safely terminated or aborted. In most cases, a return to full-engine operation is the suitable response. When a switchover is made from full-engine operation to half-engine operation, after a balancing time it is checked whether both control units are in the half-engine operation operating mode. If this is not the case, both are in different states; half-engine operation is prohibited and both control units switch over to full-engine operation.

However, in special cases, a continuation of the switchover to half-engine operation is correct. This is the case, for example, if the point in time of the torque-neutral switchover between the two control units is balanced. After a waiting time that is longer than the typical switchover time, a switchover may be made to half-engine operation with a loss of comfort. In some cases it may be necessary to delay the error response somewhat. This is in particular the case if the error response results in a torque increase. In half-engine operation, the second control unit is completely blanked out. The switchover to full-engine operation thus means an increase in torque in this control unit. Thus the switchover to full-engine operation must always be delayed somewhat on this control unit in order to give the other control unit the possibility to detect an error and reduce the torque through the switchover to full-engine operation.

What is claimed is:

1. A computer-readable medium containing a computer program which when executed by a processor performs a method for switching over between operating modes of an internal combustion engine having a plurality of control units, the control units being adapted to exchange data via a data link, the method comprising:

checking whether an operating mode switchover should occur; and if an operating mode switchover should occur, at least one of testing the data link between the control units and balancing an operating state of the control units.

2. A device for switching between operating modes of an internal combustion engine having a plurality of control units, the control units being adapted to exchange data via a data link, the device comprising:

an arrangement for checking whether an operating mode switchover should occur and, if an operating mode switchover should occur, at least one of (a) the data link between the control units is tested and (b) an operating state of the control units is balanced.

3. The device according to claim 2, wherein the device is for a switchover between a full-engine operation and a half-engine operation.

4. A method for switching over between operating modes of an internal combustion engine having a plurality of control units, the control units being adapted to exchange data via a data link, the method comprising:

checking whether an operating mode switchover should occur; and if an operating mode switchover should occur, at least one of testing the data link between the control units and balancing an operating state of the control units.

5. The method according to claim 4, wherein a test of the data link includes a test of an electrical connection between the control units.

6. The method according to claim 4, wherein a test of the data link includes a transfer of at least one data packet between the control units and a check of the transferred data packet for transmission errors.

7. The method according to claim 4, wherein the method is for a switchover between a full-engine operation and a half-engine operation.

8. The method according to claim 7, wherein when a switchover is made from full-engine operation to half-engine operation, a check is performed after an expiration of a balancing time as to whether the control units are in the half-engine operation operating mode and that the half-engine operation is prohibited in different operating modes of the control units, all of the control units subsequently passing into full-engine operation.

9. The method according to claim 4, wherein a test of whether a switchover should occur includes an evaluation of one of a state and a content of a data transfer arrangement.

10. The method according to claim 9, wherein the data transfer arrangement includes one of a datagram of a data bus and a state of a register.

11. The method according to claim 4, wherein during the switchover operation of at least one of the control units a check is performed at specific times and/or events for a presence of a specific operating state of another of the control units.

12. The method according to claim 11, wherein if a specific operating state of the another control unit is present, the switchover is continued.

13. The method according to claim 11, wherein if a specific operating state of the another control unit is absent, the switchover is interrupted.

14. The method according to claim 11, wherein if a specific operating state of the another control unit is absent, the switchover is aborted.

* * * * *